US012683498B2

(12) United States Patent
Hariharan et al.

(10) Patent No.: US 12,683,498 B2
(45) Date of Patent: Jul. 14, 2026

(54) CONTROL CIRCUIT FOR A POWER CONVERTER WITH ADAPTIVE ERROR SIGNAL COMPENSATION

(71) Applicant: Renesas Design (UK) Limited, Bourne End (GB)

(72) Inventors: Kamala Hariharan, Morgan Hill, CA (US); Nicolas Borfigat, Chandler, AZ (US); Rosario Pagano, Phoenix, AZ (US)

(73) Assignee: Renesas Design (UK) Limited, Bourne End (GB)

( * ) Notice: Subject to any disclaimer, the term of this patent is extended or adjusted under 35 U.S.C. 154(b) by 283 days.

(21) Appl. No.: 18/362,226

(22) Filed: Jul. 31, 2023

(65) Prior Publication Data

US 2025/0047203 A1 Feb. 6, 2025

(51) Int. Cl.
*H02M 3/158* (2006.01)
*H02M 1/00* (2007.01)

(52) U.S. Cl.
CPC ....... *H02M 3/1582* (2013.01); *H02M 1/0025* (2021.05)

(58) Field of Classification Search
CPC ... H02M 3/158; H02M 3/1582; H02M 1/0025
See application file for complete search history.

(56) References Cited

U.S. PATENT DOCUMENTS

| | | | | | |
|---|---|---|---|---|---|
| 9,362,828 | B2 * | 6/2016 | Peker | ................. | H02M 3/1582 |
| 10,075,075 | B2 | 9/2018 | Zhang | | |
| 11,245,332 | B1 * | 2/2022 | Houston | ................. | H02M 1/32 |

| | | | | | |
|---|---|---|---|---|---|
| 2010/0148740 | A1 * | 6/2010 | Saitoh | ................. | H02M 3/1582 |
| | | | | | 323/283 |
| 2012/0146594 | A1 * | 6/2012 | Kobayashi | .......... | H02M 3/1582 |
| | | | | | 323/234 |
| 2014/0266085 | A1 * | 9/2014 | Unno | ...................... | H02M 3/04 |
| | | | | | 323/234 |
| 2017/0077817 | A1 * | 3/2017 | Houston | ............. | H02M 3/1582 |
| 2017/0358984 | A1 * | 12/2017 | Unno | .................... | H02M 3/158 |
| 2018/0254704 | A1 * | 9/2018 | Unno | .................. | H02M 3/1582 |
| 2019/0131877 | A1 * | 5/2019 | Luff | .................... | H02M 3/1582 |
| 2022/0069708 | A1 * | 3/2022 | Karri | .................. | H02M 1/0003 |
| 2022/0416657 | A1 * | 12/2022 | Floriani | ............. | H02M 1/0003 |
| 2024/0250598 | A1 * | 7/2024 | Kumath | ............. | H02M 1/0025 |

* cited by examiner

*Primary Examiner* — Gustavo A Rosario-Benitez

(74) *Attorney, Agent, or Firm* — SCULLY, SCOTT, MURPHY & PRESSER, P.C.

(57) ABSTRACT

Control circuits, power converters, and control methods thereof are provided. The control circuit is configured to provide at an output node of the power converter an output current at an output voltage based on electrical power at an input voltage. The control circuit is further configured to determine a voltage error signal based on the output voltage and a reference voltage for the output voltage. The control circuit is further configured to determine an operating point within the operating range that the power converter is operated in. The control circuit is further configured to adapt the voltage error signal with an operating point dependent offset that is dependent on the operating point, to determine a compensated voltage error signal. The control circuit is further configured to determine a control signal for controlling one or more power switches of the power converter in dependence of the compensated voltage error signal.

11 Claims, 7 Drawing Sheets

CONTROL CIRCUIT FOR A POWER CONVERTER WITH ADAPTIVE ERROR SIGNAL COMPENSATION

TECHNICAL FIELD

The present document relates to a control circuit for a power converter, notably a buck-boost power converter. In particular, the present document relates to providing a reliable regulation of the output voltage of a power converter across the entire operating range of the power converter.

BACKGROUND

Battery-operated portable devices have increasing performance requirements, in particular with regards to the load current and the operational efficiency. In applications where the input voltage is always higher than the output voltage, a buck power converter may be used. For applications where the input voltage is always lower than the output voltage a boost power converter may be used.

Figure 1A:
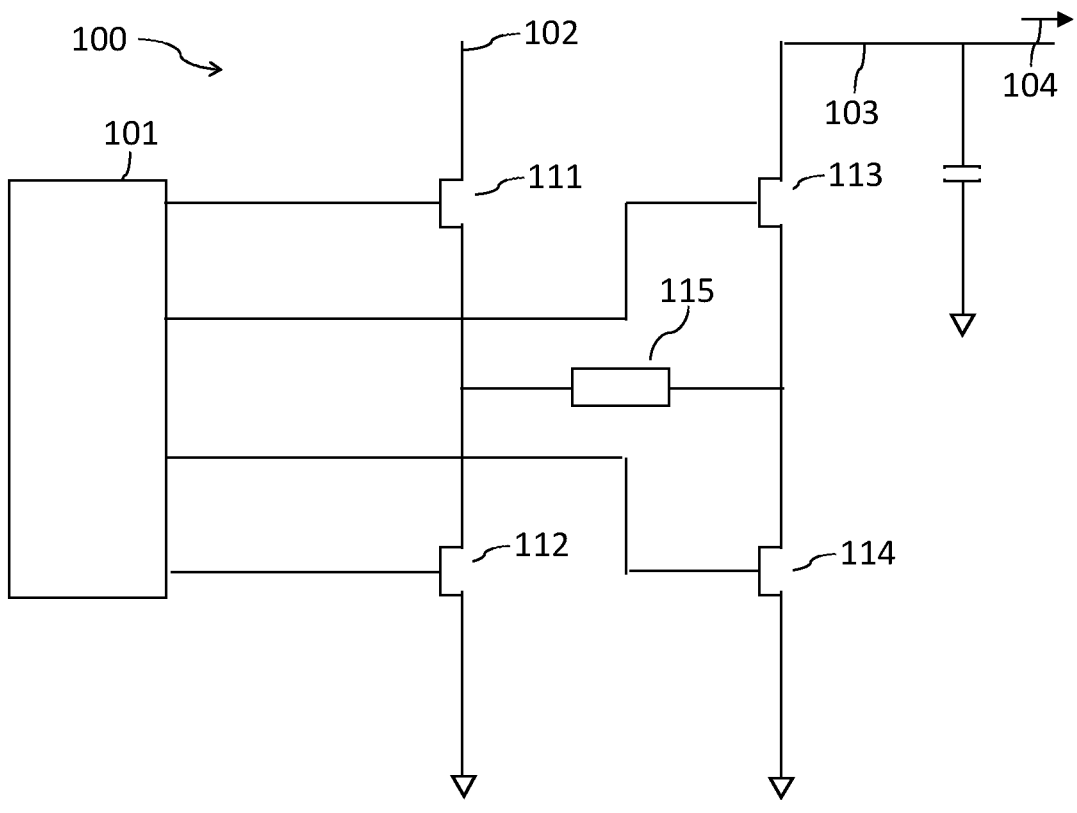

In a battery-operated device, the input voltage is provided by battery cells. As a result of this, there may be a relatively wide variation of the range of the input voltage, as the voltage of a battery cell is dependent on its charge state. Since the voltage of a battery cell decreases as it is discharged, the input voltage to the power converter may be higher, approximately equal to, or lower than the output voltage. For such a situation, a buck-boost power converter may be used, wherein the buck-boost power converter has three main operating modes:

Buck Mode→$V_{IN}$>$V_{OUT}$
Buck-Boost Mode→$V_{IN}$~$V_{OUT}$
Boost Mode→$V_{IN}$<$V_{OUT}$ FIG. 1a illustrates an example buck-boost power converter 100 which is configured to convert the input voltage 102 into an output voltage 103, while providing a certain output or load current 104. The power converter 100 comprises a control unit 101 for controlling the power switches 111, 112, 113, 114 (e.g., field effect transistors) of the power converter 110. The power converter 100 may be operated in a certain operation mode, notably a buck mode, a buck-boost mode or a boost mode, depending on the conversion ratio between the input voltage and the output voltage. Each operation mode comprises a sequence of states of the power converter 100 within an operation cycle. The operation cycle, i.e., the sequence of states, is repeated at a certain, pre-determined, cycle rate. During each operation cycle, the inductor 115 is magnetized and demagnetized, thereby providing a certain average output or load current 104 at the output of the power converter 100.

At the transition between different operation modes, notably between the buck mode and the buck-boost mode, or between the buck-boost mode and the boost mode, a glitch of the output voltage 103 may be generated. Furthermore, the precision of the regulation of the output voltage 103 may be dependent on the operation mode and/or on the conversion ratio and/or on the output voltage 103 of the power converter 100.

The present document addresses the technical problem of providing a precise regulation of the output voltage 103 of a buck-boost power converter 100 across the entire operating range. The technical problem is solved by the independent claims. Preferred examples are described in the dependent claims.

SUMMARY

According to an aspect, a control circuit for controlling a power converter, notably a buck-boost power converter, is described. The power converter is configured to provide at an output node of the power converter an output current at an output voltage based on electrical power at an input voltage, which is provided at an input node of the power converter.

The control circuit is configured to determine a voltage error signal based on the output voltage and based on a reference voltage for the output voltage, wherein the voltage error signal may exhibit a slope across the operating range of the power converter. Furthermore, the control circuit is configured to determine an operating point within the operating range, and to adapt, in particular to offset, the voltage error signal with an offset that is dependent on the operating point that the power converter is operated in, to determine a compensated voltage error signal. This (operating point dependent) offset may be such that the magnitude of the slope of the compensated voltage error signal is smaller than the magnitude of the slope of the voltage error signal. In addition, the control circuit is configured to determine a control signal for controlling one or more power switches of the power converter in dependence of the compensated voltage error signal.

According to another aspect, a method for controlling a power converter, in particular a buck-boost power converter, is described. The method comprises determining a voltage error signal based on the output voltage and based on the reference voltage for the output voltage. Furthermore, the method comprises determining an operating point within the operating range, and adapting, in particular offsetting, the voltage error signal with an offset that is dependent on the operating point that the power converter is operated in, to determine a compensated voltage error signal. The method further comprises determining a control signal for controlling one or more power switches of the power converter in dependence of the compensated voltage error signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1a illustrates an example buck-boost converter,

US 12,683,498 B2

3

Figure 1B:
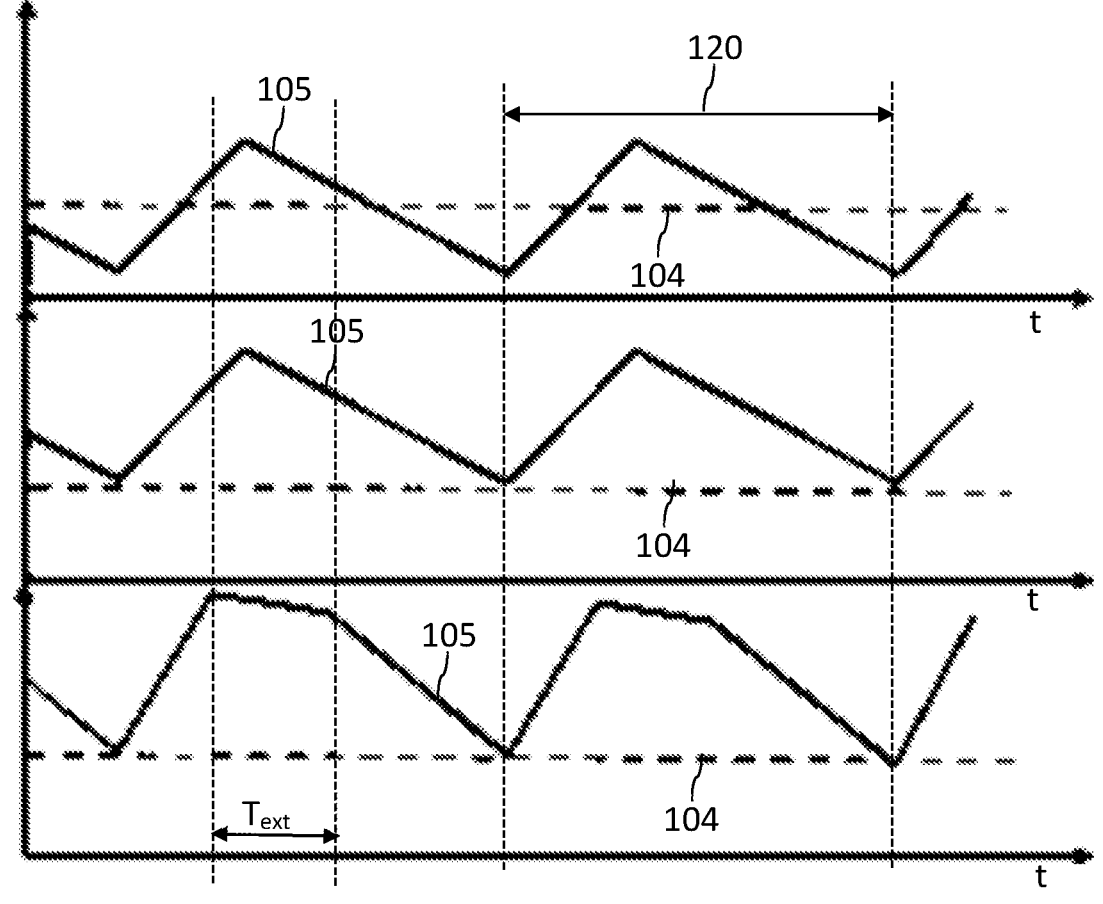
Figure 2A:
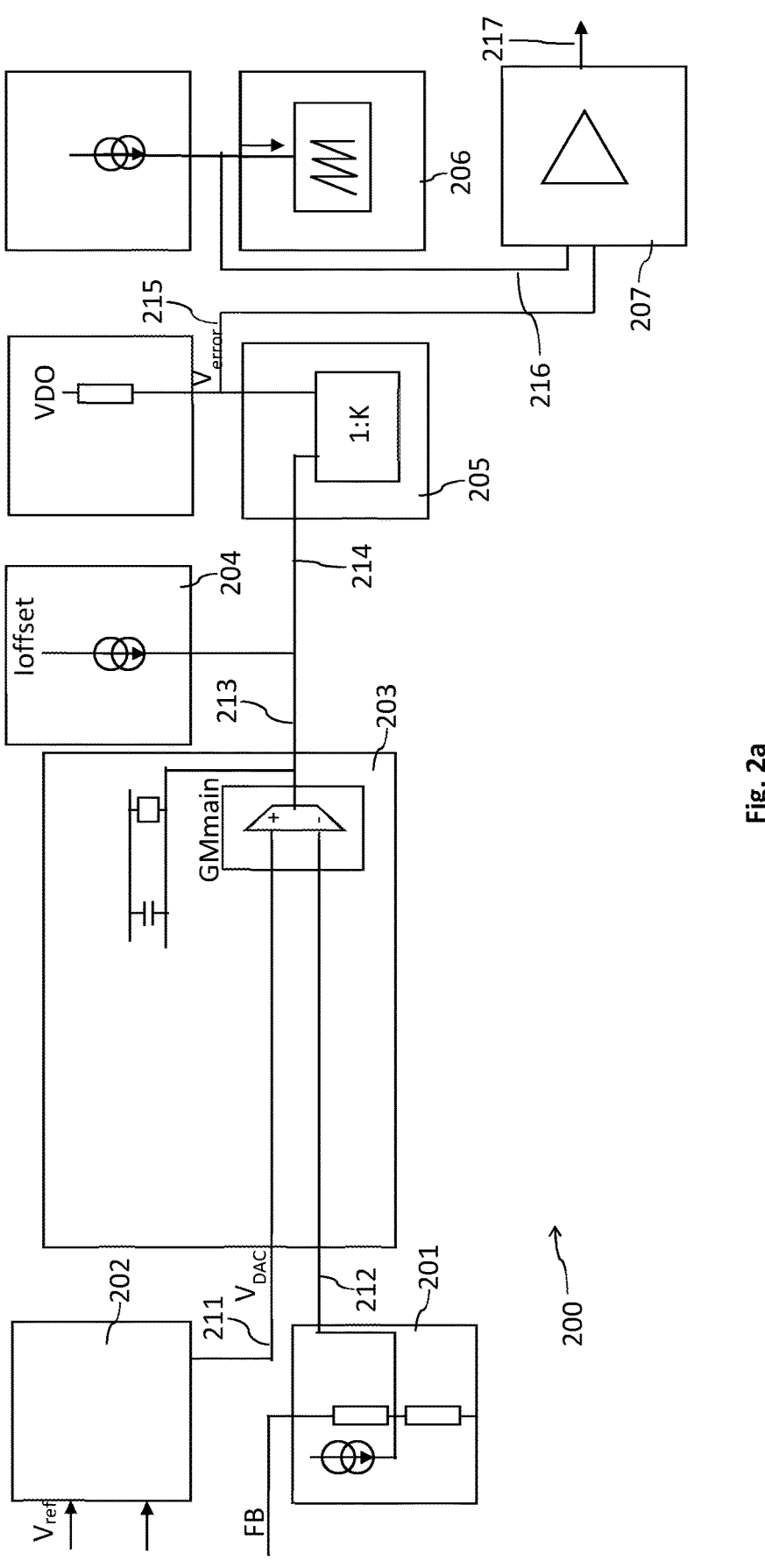
Figure 2B:
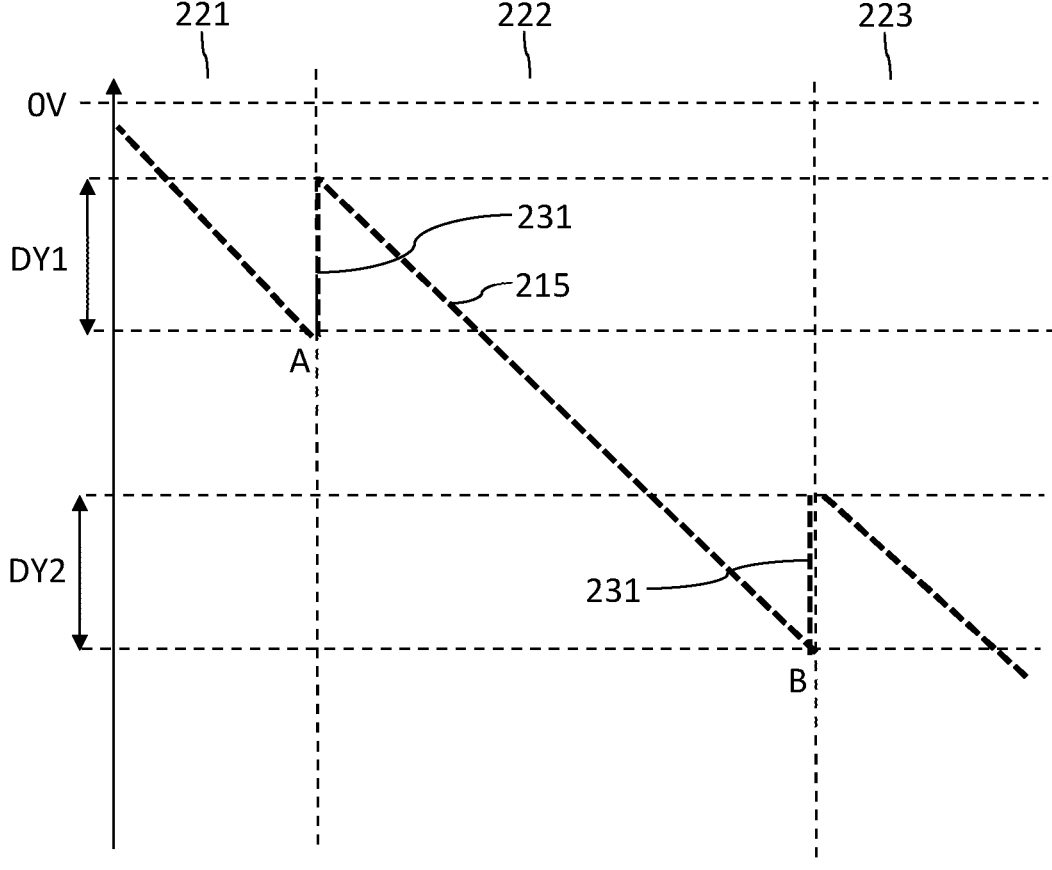
Figure 3A:
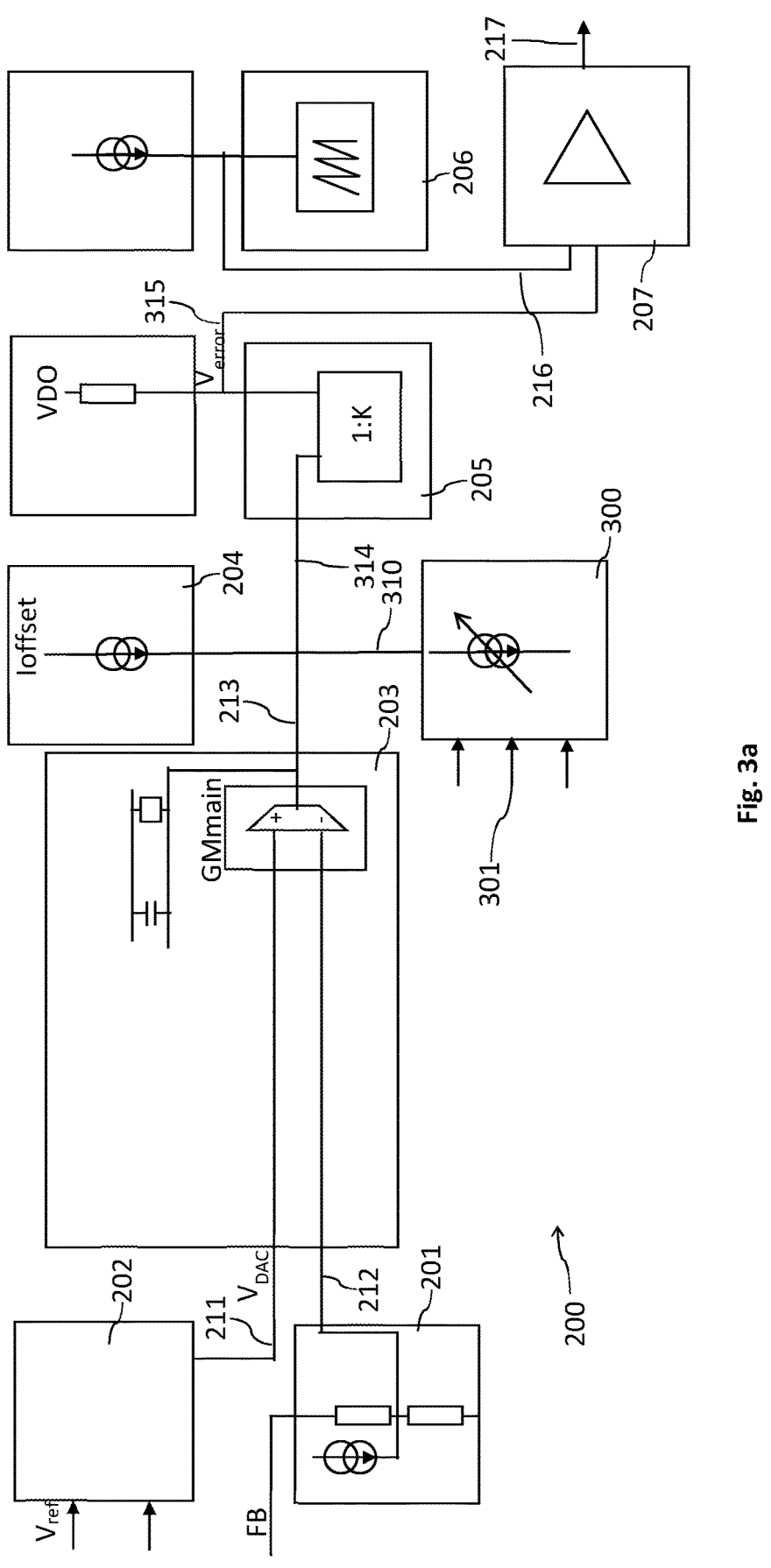
Figure 3B:
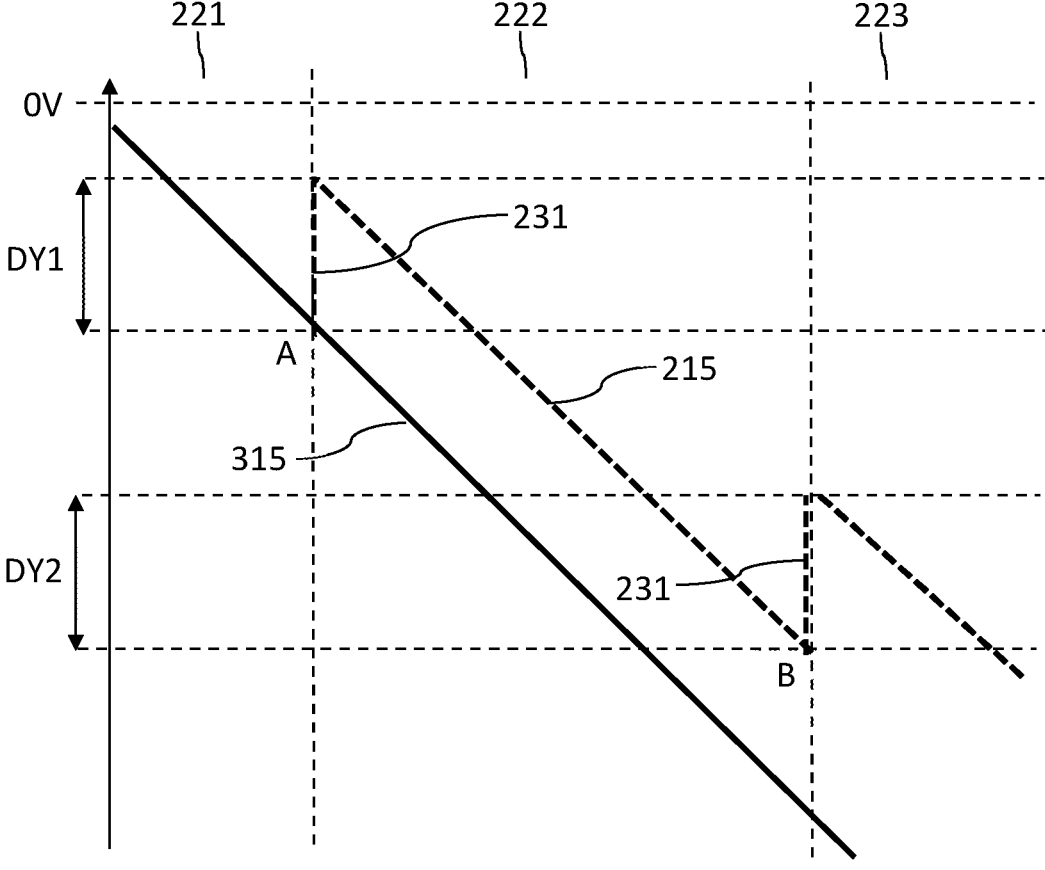
Figure 4:
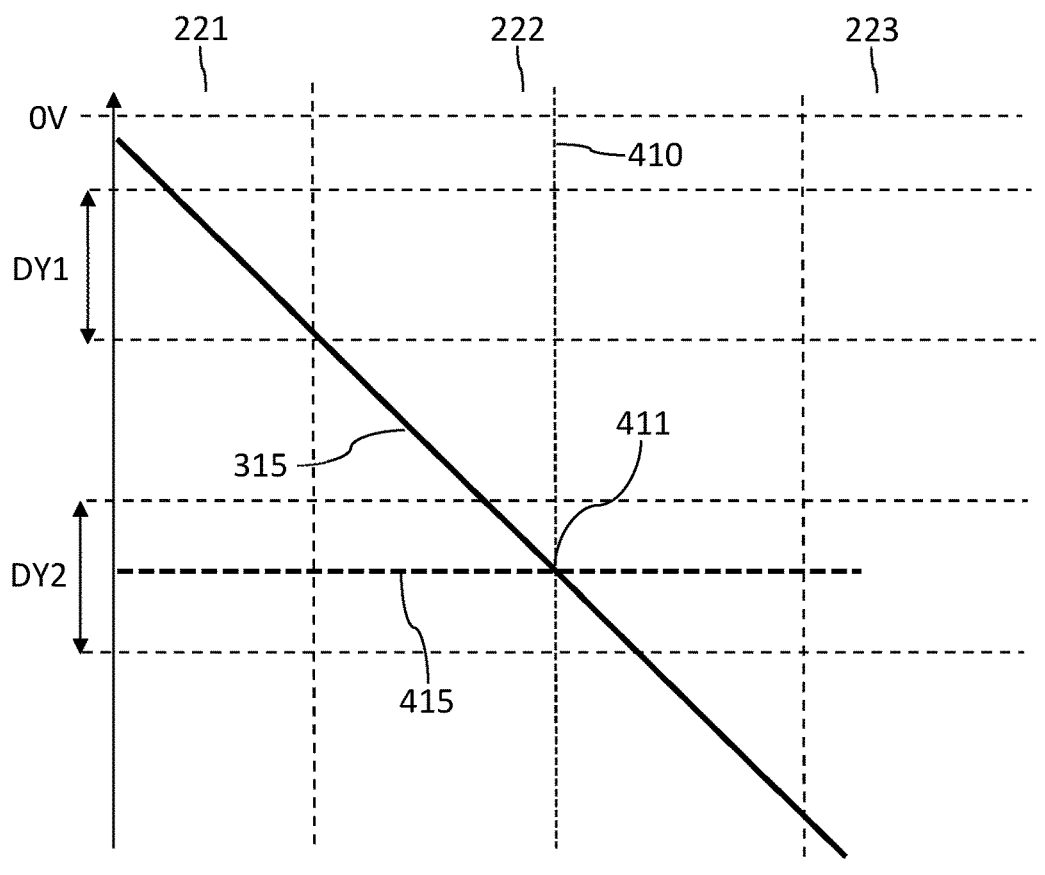
Figure 5:
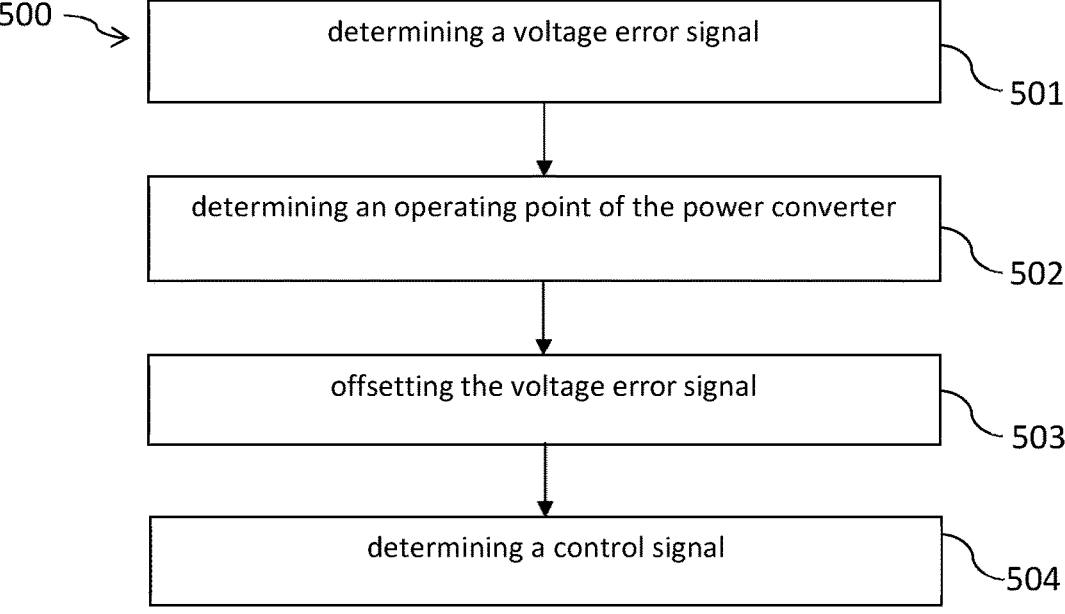

FIG. 1*b* illustrates example inductor currents and load currents of the power converter of FIG. 1*a* for different operation modes;

FIG. 2*a* shows an example control circuit for controlling the duty cycle of a buck-boost converter;

FIG. 2*b* shows example glitches of the voltage error signal at mode transitions;

FIG. 3*a* shows an example control circuit which comprises an error voltage compensation unit;

FIG. 3*b* illustrates the error voltage of the control circuit across different operation modes;

FIG. 4 illustrates an error voltage with a reduced slope, in particular with a zero slope; and FIG. 5 shows a flow chart of an example method for controlling a buck-boost power converter.

DETAILED DESCRIPTION

As indicated above, the present document is directed at providing a precise regulation of the output voltage of a power converter 100, in particular a buck-boost power converter 100, within different operation modes and/or for a wide range of conversion ratios. In this context, FIG. 1*b* illustrates the waveforms of the inductor current 105 through the inductor 115 for the different operation modes, notably for the buck mode (upper diagram), the boost mode (middle diagram) and the buck-boost mode (lower diagram). Furthermore, FIG. 1*b* illustrates the output and/or load current 104 which is provided at the output of the power converter 100. In addition, FIG. 1*b* indicates the duration $T_s$ of an operation cycle 120 of each of the operation modes. Furthermore, the extension time $T_{ext}$ used within the buck-boost mode is indicated.

Depending on the operation mode, the same duty cycle corresponds to a different current 104 delivered to the output of the power converter 100. In particular, $$\langle I_{L,BUCK} \rangle = i_{Load}$$

for the buck mode, $$\langle I_{L,BOOST} \rangle = \frac{iLoad}{1 - D_{BST}}$$

for the boost mode, and $$\langle I_{L,BUCK-BOOST} \rangle = \frac{iLoad}{1 - D_{BST}}$$

$$D_{BST} = \frac{M - \frac{T_{EXT}}{T_S}}{1 + M}$$

$$M = V_{OUT}/V_{IN}$$

for the buck-boost mode. Due to this, a voltage glitch may be created at a mode transition between two different operation modes of the power converter 100.

FIG. 2*a* shows an example control circuit 200 for controlling a buck-boost power converter 100, in particular for setting the duty cycle of the buck-boost power converter 100, within an operation mode of the power converter 100. The control circuit 200 comprises a feedback unit 201 which is configured to generate a feedback voltage 212 based on the output voltage 103 of the power converter 100. Furthermore, the control circuit 200 comprises a reference unit 202 which is configured to provide a reference voltage 211 for the output voltage 103.

The feedback voltage 212 may be compared with the reference voltage 211 within a comparison unit 203, thereby providing a delta signal 213 (notably a delta current or a delta voltage), which is indicative of the deviation of the feedback voltage 212 from the reference voltage 211. The delta signal 213 may be offset using an offset unit 204, thereby providing a corrected delta signal 214 which may be amplified within an amplification unit 205, e.g., within a current mirror or voltage multiplier, to provide the error voltage 215.

The error voltage 215 may be compared with a (sawtooth) ramp voltage 216 (comprising a periodic (sawtooth) ramp with a periodicity in accordance to the duration of the operation cycle 120) which may be provided by a ramp signal unit 206. The ramp voltage 216 may be generated in dependence of the inductor current 105, in particular in dependence of the peak of the inductor current 105.

The error voltage 215 and the ramp voltage 216 may be compared within a PWM (pulse width modulation) comparator unit 207 to provide the control signal 217 for the power switches 111, 112, 113, 114 of the power converter 100. The control signal 217 may be indicative of the duty cycle which is to be used for operating the power converter 100. The control signal 217 may be used by the control unit 101 to generate the drive signals for controlling the power switches 111, 112, 113, 114.

When using peak-current based control, the following applies:

$$[V_{DAC} - (V_{OUT}/FB_{ratio})] \times g_{mLOOP} = I_L/N_S + IslopeComp$$

wherein $V_{DAC}$ is the reference voltage 211, $V_{OUT}/FB_{ratio}$ is the feedback voltage 212, $g_{mLOOP}$ is the gain which is applied by the control circuit 200 when generating the error voltage 215. $I_L$ is the inductor current 105, Ns is a gain applied to the inductor current 105 and IslopeComp is a slope compensation which is applied in the context of the current based control (within the ramp signal unit 206).

The above-mentioned control scheme results in discontinuities in the Verror signal 215 at mode transition boundaries between the buck mode, the boost mode and the buck-boost mode, as illustrated in FIG. 2*b*. These discontinuities cause glitches in the output voltage. In particular, FIG. 2*b* illustrates the Verror signal 215 across the different modes, in particular the buck mode 221, the buck-boost mode 222 and the boost-mode 223. It can be seen that at the transition between two different modes 221, 222, 223 a glitch 231 of the Verror signal 215 is generated, which causes a corresponding glitch of the output voltage 103.

Hence, it may be an objective to remove the glitches 231 in the error signal 215 at the mode transition boundaries. In particular, it may be an objective to provide a linear error signal 215 across the transition boundaries regardless of the input and/or output voltage conditions.

This may be achieved by applying an offset within the control circuit 200 that is adjusted based on the operating mode. This adaptive offset may remove the glitches 231 and may provide a linear error signal 215. Furthermore, this adaptive offset may remove the corresponding output voltage glitches and may provide an improved output voltage characteristic of the power converter 100.

As indicated above, a buck-boost converter 100 may be used for a portable equipment, because the battery voltage is dependent on the charge state (the battery voltage decreases as the battery discharges). As a result of this, the input voltage of the power converter 100 may be above, about the same, or below the desired output voltage. When using peak-current based control, glitches 231 occur on the error signal 215 at the transition boundaries between operating modes (buck mode 221 to buck-boost mode 222, and/or buck-boost mode 222 to boost mode 223). These glitches 231 typically manifest on the output voltage 103.

As outlined in the present document, an adaptive offset to the error signal 215 may be used, which removes the glitches 231 and which results in a linear error signal 215. As a result, the output voltage 103 does not exhibit glitches at the mode transitions.

FIG. 3a shows an example control circuit 200 which comprises an adaptive offset and/or compensation unit 300. The compensation unit 300 may be configured to generate a pedestal signal 310 (i.e., an offset), in particular a pedestal voltage or current, which is configured to adapt, in particular to offset, the delta signal 213 in an adaptive manner. The compensation unit 300 shown in FIG. 3a is only one example of generating a pedestal signal 310.

The compensation unit 300 may be configured to generate the pedestal signal 310 in dependence of the input voltage 102, the output voltage 103, and an indicator 301 which indicates a mode transition and/or which indicates the currently used operation mode 221, 222, 223. Based on this information, the value of the pedestal signal 310 (i.e., of the offset) may be determined using a pre-determined mapping unit, e.g., a pre-determined look-up table.

The mapping unit may be determined as follows (using the power converter 100, which is preferably integrated within its application), For each (VIN, VOUT) pair the $I_{Lpeak}$ and the loop error voltage 215 is determined.

As a result of this, a function Verror=f(VOUT,VIN) may be determined as illustrated e.g. in FIG. 2b or 3b;

Starting from point A in FIG. 2b or 3b DY1 may be determined and based on this, the parameters a1 and b1 may be determined. These parameters may be used to apply an offset [a1*VOUT+b1] for the buck-boost mode 222 only.

In a similar manner, starting from point B in FIG. 2b or 3b DY2 and the parameters a2 and b2 may be determined. These parameters may be used to apply an offset [a2*VOUT+b2] for the boost mode 223 only.

Hence, an adaptive offset for the buck-boost mode 222 and/or for the boost mode 223 may be determined during a calibration phase of the control circuit 200 and/or of the power converter 100. The adaptive offset 310, i.e., the pedestal signal, may then be applied during operation of the control circuit 200 and/or power converter 100, thereby providing a compensated delta signal 314, and the linear curve of the compensated voltage error signal 315 shown in FIG. 3b.

The pedestal voltage 310 may be generated by a plurality of selectable current sources (not illustrated). Depending on the correction needed, the appropriate pedestal offset voltage 310 is produced. To control the selection, the control circuit 200 may make use of a look-up table (not illustrated) that receives Vin 102, Vout 103, and the mode change or the mode 221, 222, 223 (buck to buck/boost and vice versa, buck/boost to boost, and vice versa). Based on the Vin and Vout inputs as well as based on the mode or mode change, the lookup table selects the appropriate current source to provide the desired pedestal offset voltage 310 to the generation of the compensated error voltage 315.

FIG. 3b shows the Verror signal, i.e., the compensated error voltage 315, as a function of the target output voltage and/or as a function of the conversion ratio of the power converter 100. It can be seen that, even after removal of the glitches 231, the value of the compensated error voltage 215 strongly depends on the target output voltage and/or on the conversion ratio. In other words, the compensated error voltage 215 exhibits a slope across the range of target output voltages and/or conversion ratios, which is non-zero, in particular which is negative. This slope may impact the precision of the regulation of the output voltage 103 to the respective target output voltage (i.e., to the respective reference voltage 211).

The compensation unit 300 may be configured to generate an adaptive offset 310, i.e., a pedestal voltage, which is configured to modify the error voltage 215 (notably the delta signal 213) such that the magnitude and/or the value of the compensated error voltage 315 is substantially independent of the target output voltage and/or of the conversion ratio (i.e., of the operating point of the power converter 100). By doing this, the output voltage 103 may be regulated in a precise manner across the entire range of target output voltages and/or conversion ratios (i.e., across the entire operating range of the power converter 100).

FIG. 4 illustrates a compensated voltage error signal 415 which is substantially constant across the entire range of target output voltages and/or conversion ratios. This may be achieved by rotating the (linearized) voltage error signal 315 (as shown in FIG. 3b) around a rotation point 411, wherein the rotation point 411 may be placed at a pre-defined target output voltage and/or conversion ratio 410. During the calibration phase, an offset 310, i.e., a pedestal voltage, may be determined for different values within the range of target output voltages and/or conversion ratios (i.e., for different operating points of the power converter 100). The offset 310 may be determined based on the non-compensated voltage error signal 215, such that the compensated voltage error signal 415 (which has been compensated by the offset 310) is substantially constant for the different values within the range of target output voltages and/or conversion ratios. The offsets 310 may be stored within a look-up table.

Hence, as can be seen in the context of FIG. 3b, for peak-current based control, the VOUTerror signal 215 exhibits a negative slope across the buck, the buck-boost and the boost mode. In the present document, an adaptive offset 310 to the voltage error signal 215 (notably to the delta signal 213) is used to generate a compensated voltage error signal 315, 415 that exhibits a slope of approximately zero across the buck, the buck-boost and the boost modes. As a result, the output voltage regulation across all operating modes is improved. The adaptive offset 310 may be generated using the compensation unit 300.

The adaptive offset 310 may be determined for various different operating points, notably for various different conversion ratios or for various different target output voltages, during the calibration phase. For a particular operating point, the difference between the (possibly linearized) VOUTerror signal 215, 315 and the target error signal (having a slope of zero) is computed. This difference may be stored as the adaptive offset 310 for the particular operating point. In a similar manner, offsets 310 may be determined for a plurality of different operating points.

Alternatively, the adaptive offset 310 may be approximated by a linear function (e.g., a linear function of the target output voltage and/or of the conversion ratio). The coefficients of the linear function may be determined by computing the difference between the (possibly linearized) VOUTerror signal 215, 315 and the target voltage error signal (having a slope of zero) for at least two different operating points.

FIG. 5 shows a flow chart of an example (possibly computer-implemented) method 400 for controlling a power converter 100, notably a buck-boost power converter 100, which is configured to provide at an output node of the power converter 100 an output current 104 at an output voltage 103 based on electrical power at an input voltage 102, which is provided at an input node of the power converter 100 (e.g., by a battery).

The method 500 comprises determining 501 a voltage error signal 215, 315 based on the output voltage 103 and based on the reference voltage 211 for the output voltage 103 (i.e., the target output voltage). The voltage error signal 215, 315 exhibits a (negative) slope across the operating range of the power converter 100 (as illustrated e.g., in FIG. 3b). The voltage error signal 215, 315 may have been linearized to remove one or more glitches 231 (as outlined in the context of FIG. 3b).

Furthermore, the method 500 comprises determining 502 an operating point within the operating range that the power converter 100 is operated in. The operating point may correspond to a particular conversion ratio and/or to a particular target output voltage or reference voltage 211 of the power converter 100.

The method 500 further comprises adapting, in particular offsetting, 503 the voltage error signal 215, 315 with an offset 310 which is dependent on the operating point that the power converter 100 is operated in, to determine a compensated voltage error signal 415. This operating point dependent offset 310 may be such that the magnitude of the slope of the compensated voltage error signal 415 is smaller than the magnitude of the slope of the (non-compensated) voltage error signal 215. In particular, the operating point dependent offset 310 may be such that the magnitude of the slope of the compensated voltage error signal 415 is substantially zero (across the entire operating range of the power converter 100). The operating point dependent offset 310 may have been pre-determined within a calibration phase, and may have been stored within a storage unit.

The (non-compensated) voltage error signal 215 is typically a function of the operating point, in particular of the output voltage 103 and/or of the reference voltage 211, of the power converter 100. This function may have a slope with a (average) magnitude. The voltage error signal 215, 315 may be adapted with an offset 310, wherein the value of the offset 310 dependents on the operating point that the power converter 100 is operated in. In other words, the value of the offset 310 may be a function of the operating point, in particular of the output voltage 103 and/or of the reference voltage 211, of the power converter 100. The offset 310 typically has different values for different operating points.

The offset 310 may have been pre-determined such that the application of the offset 310 to the voltage error signal 215, 315 leads to a reduction of the slope, notably of the magnitude of the slope, of the voltage error signal 215, 315, thereby leading to a compensated voltage error signal 415 which has a reduced slope, in particular which has a slope with a reduced magnitude. In a preferred example, the offset 310 is such that the slope of the compensated voltage error signal 415 is substantially zero (across the entire operating range of the power converter 100), and by consequence, that the value of the compensated voltage error signal 415 is independent of the operating point, in particular independent of the output voltage 103 and/or of the reference voltage 211, of the power converter 100.

In addition, the method 500 comprises determining 504 a control signal 217 for controlling one or more power switches 111, 112, 113, 114 of the power converter 100 in dependence of the compensated voltage error signal 415.

Hence, a control circuit 200 for controlling a power converter 100, notably a buck-boost power converter 100, is described, wherein the power converter 100 is configured to provide at an output node of the power converter 100 an output current 104 at an output voltage 103 based on electrical power at an input voltage 102, which is provided at an input node of the power converter 100.

The control circuit 200 is configured to determine a voltage error signal 215, 315 based on the output voltage 103 and based on the reference voltage 211 for the output voltage 103. In particular, the control circuit 200 may be configured to determine a delta signal 213 based on the output voltage 103 and based on the reference voltage 211. For this purpose, the control circuit 200 may comprise a feedback unit 201 configured to generate a feedback voltage 212 based on the output voltage 103. In addition, the control circuit 200 may comprise a comparison unit 203 configured to compare the feedback voltage 212 with the reference voltage 211 to generate the delta signal 213. The voltage error signal 215, 315 may be determined based on the delta signal 213, e.g., by an offset and/or a scaling operation. In an example, the voltage error signal 215, 315 corresponds to the delta signal 213.

The voltage error signal 215, 315 exhibits a (negative) slope across the operating range of the power converter 100. The operating range of the power converter 100 may correspond to a value range of the reference voltage 211, which spans from a minimum value to a maximum value, and an operating point of the power converter 100 may correspond to a value of the reference voltage 211, which lies between the minimum value and the maximum value. Alternatively, or in addition, the operating range of the power converter 100 may correspond to a value range of a conversion ratio between the input voltage 102 and the output voltage 103, which spans from a minimum value to a maximum value, and an operating point of the power converter 100 may correspond to a value of the conversion ratio, which lies between the minimum value and the maximum value.

The operating range of the power converter 100 may span across different operation modes 221, 222, 223 of the power converter 100, in particular across the buck mode 221, the buck-boost-mode 222 and the boost mode 223.

The control circuit 200 is further configured to determine the operating point within the operating range that the power converter 100 is (currently) operated in.

Furthermore, the control circuit 200 is configured to adapt, in particular to offset, the voltage error signal 215, 315 with an offset 310 that is dependent on the operating point that the power converter 100 is operated in, to determine a compensated voltage error signal 415. The operating point dependent offset 310 may be such that the magnitude and/or the absolute value of the slope of the compensated voltage error signal 415 is smaller than the magnitude and/or the absolute value of the slope of the (non-compensated) voltage error signal 215, 315. In particular, the operating point dependent offset 310 may be such that the magnitude and/or the absolute value of the slope of the compensated voltage error signal 415 is substantially zero across the (entire) operating range of the power converter 100, and/or that the magnitude and/or the absolute value of the slope of the compensated voltage error signal 415 is 10% or less of the magnitude of the reference voltage 211 across the (entire) operating range of the power converter 100.

Hence, the control circuit 200 is configured to apply a (pre-determined) operating point dependent offset 310 to the voltage error signal 215, 315 in order to provide a compensated voltage error signal 415 which is substantially constant across the (entire) operating range of the power converter 100, thereby enabling a precise regulation of the output voltage 103 across the (entire) operating range of the power converter 100.

The control circuit 200 may be further configured to determine a control signal 217 for controlling one or more power switches 111, 112, 113, 114 of the power converter 100 in dependence of the compensated voltage error signal 415. The control signal 217 may be indicative of the duty cycle (of one or more power switches 111, 112, 113, 114) within an operation cycle 120 of the operation mode 221, 222, 223 that the power converter 100 is operated in.

The control circuit 200 may be configured to determine the operating point dependent offset 310 from a pre-determined look-up table which indicates the offset 310 for a plurality of different operating points within the operating range of the power converter 100. Alternatively, or in addition, the control circuit 200 may be configured to determine the operating point dependent offset 310 using a pre-determined analytical function which indicates the offset 310 in dependence of the operating point within the operating range of the power converter 100.

The look-up table and/or the analytical function may have been determined in the context of a calibration phase, and may have been stored within a storage unit of the control circuit 200. By making use of a look-up table and/or an analytical function, the precision of the regulation of the output voltage 103 may be further increased.

The control circuit 200 may be configured to select the operation mode 221, 222, 223 that the power converter 100 is operated in from a plurality of different operation modes 221, 222, 223. The plurality of operation modes 221, 222, 223 may comprise a buck mode 221, a buck-boost mode 222 and a boost mode 223. The operating point dependent offset 310 may be determined in dependence on the operation mode 221, 222, 223 that the power converter 100 is operated in, thereby further increasing the precision of the regulation of the output voltage 103.

The control circuit 200 may comprise a plurality of current sources, each configured to generate an offset current. Furthermore, the control circuit 200 may be configured to control and/or to select one or more of the plurality of current sources in dependence of the operating point dependent offset 310, to adapt, in particular to offset, the voltage error signal 215, 315 using the offset current which is provided by the one or more current sources. By making use of current sources, the offset 310 may be generated in a particularly efficient and precise manner.

The control circuit 200 may be configured to perform a current, in particular a peak current, control of the power converter 100. In particular, the control circuit 200 may be configured to generate a (sawtooth) ramp signal 216 in dependence of the inductor current 105 through the inductor 115 of the power converter 100. The compensated voltage error signal 415 may be compared with the ramp signal 216 to generate the control signal 217 in a precise and robust manner.

As outlined above, it may be beneficial to first linearize the voltage error signal 215, 315 (by removing one or more glitches 231 at one or more transitions between different operation modes 221, 222, 223 of the power converter 100)

before applying the operating point dependent offset 310 (to reduce the slope of the voltage error signal 215, 315). In this context, the control circuit 200 may be configured to adapt, in particular to offset, the delta signal 213 in dependence of the operation mode 221, 222, 223 of the power converter 100, to determine the voltage error signal 215, 315.

The delta signal 213 may exhibit a glitch 231 at a transition between two different operation modes 221, 222, 223 of the power converter 100. The control circuit 200 may be configured adapt, in particular to offset, the delta signal 213 such that the amplitude of the glitch 231 at the transition between two different operation modes 221, 222, 223 is smaller within the voltage error signal 215, 315 than within the delta signal 213.

Hence, the control circuit 200 may be configured to apply a first offset 310 to the delta signal 213 to determine the voltage error signal 215, 315. The first offset 310 may be dependent on the operation mode 221, 222, 223 of the power converter 100.

The control circuit 200 may be configured to use a (pre-determined) mapping unit for determining the first offset 310. The mapping unit may be indicative of a relationship, in particular a functional relationship and/or a look-up table, between the output voltage 103 and the operation mode 221, 222, 223 of the power converter 100 on one side, and the corresponding first offset (310) on the other side.

In a preferred example, the control circuit 200 is configured to determine the first offset 310 using a polynomial function, in particular the function a*Vout+b, comprising one or more polynomial parameters, in particular a and b, wherein Vout is the output voltage 103. The one or more polynomial parameters may be dependent on the operation mode 221, 222, 223 of the power converter 100.

By applying a first offset 310 to the delta signal 213 for removing one or more glitches 231, the precision of the voltage regulation may be further increased.

Furthermore, a power converter 100, notably a buck-boost power converter 100, is described which comprises the control circuit 200 described herein.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A control circuit for controlling a power converter which is configured to provide at an output node of the power converter an output current at an output voltage based on electrical power at an input voltage, which is provided at an input node of the power converter, wherein the control circuit is configured to:

determine a delta signal based on the output voltage and based on a reference voltage;

select an operation mode that the power converter is operated in from a plurality of different operation modes, wherein the plurality of operation modes comprises a buck mode, a buck-boost mode and a boost mode;

adapt the delta signal in dependence of the selected operation mode of the power converter, to determine a voltage error signal, wherein the voltage error signal exhibits a slope as a function of a conversion ratio between the input voltage and the output voltage of the power converter corresponds to a value range of the conversion ratio between the input voltage and the output voltage, which spans from a minimum value to a maximum value;

determine an operating point within the operating range that the power converter is operated in, wherein the operating point corresponds to a value of the conversion ratio, which lies between the minimum value and the maximum value;

adapt the voltage error signal with an offset that is dependent on the operating point that the power converter is operated in, to determine a compensated voltage error signal, wherein the operating point dependent offset is such that a magnitude of a slope of the compensated voltage error signal as a function of a conversion ratio between the input voltage and the output voltage of the power converter is smaller than a magnitude of the slope of the voltage error signal; and determine a control signal for controlling one or more power switches of the power converter in dependence of the compensated voltage error signal.

2. The control circuit of claim 1, wherein the offset is such that the magnitude of the slope of the compensated voltage error signal is:

substantially zero across the operating range of the power converter; or

10% or less of a magnitude of the reference voltage across the operating range of the power converter.

3. The control circuit of claim 1, wherein the control circuit is configured to:

determine the offset from a pre-determined look-up table which indicates the offset for a plurality of different operating points within the operating range of the power converter; or determine the offset using a pre-determined analytical function which indicates the offset in dependence of the operating point within the operating range of the power converter.

4. The control circuit of claim 1, wherein:

the delta signal exhibits a glitch at a transition between two different operation modes of the power converter; and the control circuit is configured to adapt the delta signal such that an amplitude of the glitch at the transition between two different operation modes is smaller within the voltage error signal than within the delta signal.

5. The control circuit of claim 1, wherein:

the control circuit is configured to apply a first offset to the delta signal to determine the voltage error signal; and the first offset is dependent on the operation mode of the power converter.

6. The control circuit of claim 5, wherein:

the control circuit is configured to use a mapping unit for determining the first offset; and the mapping unit is indicative of a relationship between the output voltage and the operation mode of the power converter on one side, and the corresponding first offset on the other side.

7. The control circuit of claim 1, wherein the control circuit is configured to:

generate a ramp signal in dependence of an inductor current through an inductor of the power converter; and compare the compensated voltage error signal with the ramp signal to generate the control signal.

8. The control circuit of claim 1, wherein the control circuit is configured to perform a current control of the power converter.

9. The control circuit of claim 1, wherein the control signal is indicative of a duty cycle within an operation cycle of the operation mode that the power converter is operated in.

10. A power converter configured to provide at an output node of the power converter an output current at an output voltage based on electrical power at an input voltage, which is provided at an input node of the power converter, the power converter comprising:

the control circuit according to claim 1.

11. A method for controlling a power converter which is configured to provide at an output node of the power converter an output current at an output voltage based on electrical power at an input voltage, which is provided at an input node of the power converter, the method comprising:

determining a delta signal based on the output voltage and based on a reference voltage;

selecting an operation mode that the power converter is operated in from a plurality of different operation modes, wherein the plurality of operation modes comprises a buck mode, a buck-boost mode and a boost mode;

adapting the delta signal in dependence of the selected operation mode of the power converter, to determine a voltage error signal, wherein the voltage error signal exhibits a slope as a function of a conversion ratio between the input voltage and the output voltage of the power converter corresponds to a value range of the conversion ratio between the input voltage and the output voltage, which spans from a minimum value to a maximum value;

determining an operating point within the operating range that the power converter is operated in, wherein the operating point corresponds to a value of the conversion ratio, which lies between the minimum value and the maximum value;

adapting the voltage error signal with an offset that is dependent on the operating point that the power converter is operated in, to determine a compensated voltage error signal, wherein the operating point dependent offset is such that a magnitude of a slope of the compensated voltage error signal as a function of a conversion ratio between the input voltage and the output voltage of the power converter is smaller than a magnitude of the slope of the voltage error signal; and determining a control signal for controlling one or more power switches of the power converter in dependence of the compensated voltage error signal.

* * * * *